United States Patent [19]

Fiore et al.

[11] 3,857,759
[45] Dec. 31, 1974

[54] PROCESS FOR PURIFYING 1,3-DIOXOLANE BY TREATMENT WITH $NH_3$ AND DISTILLATION WITH CYCLOHEXANE

[75] Inventors: Leonardo Fiore; Giorgio Nissim, both of Milan; Francesco Corrado, Novara, all of Italy

[73] Assignee: Montecatini Edison S.p.A., Milan, Italy

[22] Filed: June 21, 1973

[21] Appl. No.: 372,253

[30] Foreign Application Priority Data
June 22, 1972 Italy .................................. 26030/72

[52] U.S. Cl. ..................... 203/29, 203/14, 203/68, 203/81, 260/340.9
[51] Int. Cl. ......................... B01d 3/36, C07d 13/02
[58] Field of Search ............ 203/14, 68, 44, 39, 29, 203/81; 260/340.9

[56] References Cited
UNITED STATES PATENTS
3,410,760  11/1968  Craig et al. ........................... 203/14

FOREIGN PATENTS OR APPLICATIONS
1,133,388  11/1968  Great Britain ................... 260/340.9
1,172,687   6/1964  Germany ......................... 260/340.9
1,294,390   5/1969  Germany ......................... 260/340.9
1,279,025  10/1968  Germany ......................... 260/340.9

*Primary Examiner*—Wilbur L. Bascomb, Jr.

[57] ABSTRACT

The monomer 1,3-dioxolane having a high degree of purity and particularly adapted to use in cationic catalytic polymerization is obtained starting from the raw product obtained in the reaction of formaldehyde with ethylene glycol. The purification process involves three different steps of phases as follows:

1. treatment of the raw reaction product with $NH_3$;
2. rectifying the $NH_3$ - treated raw reaction product to obtain a dioxolane-water azeotrope; and
3. removal of essentially all impurities from dioxolane by subjecting the azeotrope of step (2) to azeotropic distillation in presence of cyclohexane.

2 Claims, No Drawings

PROCESS FOR PURIFYING 1,3-DIOXOLANE BY TREATMENT WITH NH₃ AND DISTILLATION WITH CYCLOHEXANE

THE PRIOR ART

It is known to obtain 1,3-dioxolane by reacting formaldehyde with ethylene glycol. The reaction, represented schematically as follows:

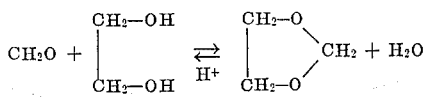

is carried out in the presence of acid catalysts. The reaction equilibrium is shifted to the right by removing the reaction products from the reactor by simple distillation.

The distillate, which fundamentally comprises dioxolane and water in a molar ratio of 1:1, also comprises unconverted reactants and volatile reaction products such as formaldehyde, methanol, formic acid and methyl formate.

The dioxolane must be separated from a very high proportion of the water and other impurities present in the distillate before it can be used satisfactorily as monomer in a cationic polymerization process, since if the dioxolane is impure the action of the catalyst is completely inhibited or the dioxolane cannot be polymerized to a polymer of high molecular weight due to the effects of chain transfer reactions.

The dioxolane, which boils at 75°C to 76°C, forms an azeotropic mixture of 7 percent water which azeotrope boils at 71°C – 72°C. Purification of the azeotrope involves a number of quite serious problems, esepcially for the high titer required ( < 99.95 percent).

Most of the known processes for the purification of dioxolane are based on methods for the extraction of the dioxolane from the aqueous raw dioxolane with solvents, such as tetralin, methylene chloride and n-heptane, followed by treatment of the solution thus obtained to eliminate some of the impurities and, finally, by fractional distillation of the solution for recovering the purified dioxolane therefrom.

In order to obtain a high recovery of relatively pure dioxolane by methods involving extration of the raw aqueous dioxolane with solvents, a number of successive stages or phases are required, as well as the presence of considerable quantities of solvent in the cycle.

In some cases, for instance with tetralin, the distribution of the dioxolane between the aqueous pahse and the organic phase, is not altogether favorable and a salting out with electrolytes is required.

Moreover, it becomes necessary to subsequently wash the layer containing dioxolane with alkaline solutions and finally to eliminate a high proportion of water from the layer. This may be achieved by azeotropic distillation with the extraction solvent (as in the case when the solvent is methylene chloride which forms an azeotrope ob 1 percent water), but more often it is achieved by distillation of the water-dioxolane azeotrope. In this latter instance, a considerable loss of dioxolane (as high as 20 percent) occurs, and the separation is difficult due to the relatively small difference between the boiling points (71°-72°C as against 75°- 76°C).

For all of the reasons mentioned, many of the patents concerned with purification of dioxolane by extration of the raw aqueous dioxolane with solvents recommend, as a final step passing the rectified dioxolane over molecular sieves. At the same time, the art has recognized that the use of molecular sieves for such purpose has the disadvantage that the efficiency of absorption of the sieves is completely exhausted after only three or four regeneration cycles.

Another process which involves countercurrent extraction of the raw aqueous dioxolane by means of concentrated caustic soda solutions requires, for the eliminiation of water and methanol, a rectification with the removal of the water-dioxolane azeotrope and, moreover, concentration of the NaOH lye, before re-use thereof.

Still another known process for the purification of dioxolane comprised in the raw dioxolane contemplates obtaining anhydrous dioxolane by trans-acetalization. That process comprises a complex series of operations including synthesis of the formula of monovalent alcohol, purification of the latter, the trans-acetalization reaction, and recovery of the intermediate reactants.

None of the known prior art processes have been entirely satisfactory for obtaining, from the raw reaction product of formaldehyde and ethylene glycol, and at comparatively low cost, a high yield of dioxolane in a state of purity adapting it to being polymerized to high molecular weight polymers in contact with cationic catalysts.

THE PRESENT INVENTION

An object of the present invention was to provide an improved process for recovering 1,3-dioxolane from the raw aqueous dioxolane in a high yield and free, or essentially free, of impurities which inhibit polymerization of the dioxolane by cationic catalysts or prevent the polymerization thereof to high molecular weight polymers by means of such catalysts.

These and other objects as will appear are accomplished by the present process which comprises three steps as follows:

1. treatment with NH₃ of the raw distillate dioxolane-water obtained from the reaction between formaldehyde and ethylene glycol.
2. obtainment of a dioxolane-water azeotrope by rectification; and
3. purification of the dioxolane from all or essentially all impurities by distilling in the presence of cyclohexane the distilled fraction of step (2) comprising dioxolane, water and reduced quantities of impurities.

Steps (1) and (2) are known, as indicated.

In step (1) the formaldehyde and the formic acid present in the raw dioxolane are converted into non-volatile products. The conversion is instantaneous and gives high yields. Step 2 results in elimination of the major portion of the water present in the raw aqueous dioxolane. In fact, from a starting raw dioxolane containing about 20 percent of water, there is obtained, by step 2, and as head fraction, an azeotrope containing only about 7 percent of water. By step (2), also, non-volatile impurities are removed as tail fraction.

In step (3), which is new and in accordance with this invention, a certain quantity of cyclohexane, which can be very limited amount, is mixed with the head fraction of step (2) and the mixture thus obtained is distilled.

The following binary azeotropes of dioxolane have been described in the literature:

- with methanol (38%)     - b.p. 54°C
- with water (8.5%)     - b.p. 68.9°C
- with formic acid (30%)     - b.p. 70.7°C In addition, the existence of a cyclohexane - dioxolane azeotrope containing 58.6 percent of cyclohexane and boiling at 67.5°C has been ascertained experimentally.

We have now found surprisingly that if, after subjecting the raw aqueous dioxolane obtained from the reaction between formaldehyde and ethylene glycol to the known steps (1) and (2), the head fraction of step (2) comprising dioxolane, water and reduced quantities of the impurities initially present in the raw dioxolane, is distilled in the presence of cyclohexane, a head fraction (3) is obtained which, on condensation, separates into two layers, an organic layer consisting of cyclohexane and dioxolane which is recycled back to the distillation column and an aqueous layer substantially free of cyclohexane which is eliminated from the cycle by discharging. A tail fraction consisting of cyclohexane and dioxolane is also obtained.

The head fraction (3) comprises a ternary azeotropic composition boiling at 62°C and which contains cyclohexane, dioxolane and water in the following proportions:

- cyclohexane = 51.1%
- dioxolane = 43.7%
- water = 5.2%

Furthermore it was also found that in this azeotropic head distiallate pass the other impurities still present in the dioxolane: methanol, methyl formiate and traces of formic acid.

The unexpected advantage of distilling in the presence of cyclohexane the head fraction of step (2) comprising dioxolane, water and reduced quantities of the impurities, is that, as stated, on condensation the azeotropic fraction dioxolane/cyclohexane/water thus obtained separates into two distinct layers, an organic layer consisting of cyclohexane and dioxolane and an aqueous layer which, in addition to some dioxolane, contains practically all of the impurities still present in the dioxolane submitted to the azeotropic distillation.

The weight ratio between the two layers is equal to organic layer / aqueous layer = abt 10.5

The approximate compositions of the two layers are:
organic layer
- cyclohexane — 56%
- dioxolane — 44%

Aqueous layer
- water — 60%
- dioxolane — 40%

By recycling the organic layer back to the distillation boiler, and discharging the aqueous layer, which is practically free of cyclohexane, from the system, the water and impurities present therein are eliminated without any consumption of cyclohexane and with a small loss of the dioxolane submitted to the azeotropic distillation.

The process of the invention can be carried out discontinuously or continuously.

In discontinuous operation, once the water and impurities have been completely eliminated, the binary dioxolane-cyclohexane azeotrope is separated by distillation. Pure dioxolane containing less than 50 p.p.m. of water and having a titer of more than 99.95 percent remains in the boiler. It is also possible to recylce the dioxolane-cyclohexane azeotrope back to the boiler together with raw dioxolane-water mixture in a subsequent distillation charge, whereby it becomes possible to obtain "polymerization grade" dioxolane in a yield higher than 95 percent.

In continuous operation, the raw aqueous dioxolane is fed in at a suitably chosen point of rectification column. Dioxolane of high purity is withdrawn from the bottom of the column and after separation of the aqueous phase from the head condensate, the organic phase or layer is recycled back into the column.

A particular advantage of the present process is that the dioxolane contained in the aqueous layer resulting from condensation of the azetropic head distillate of step (3) and containing dioxolane, water and impurities in reduced quantities as compared to the amounts thereof present in the raw product of the formaldehyde-ethylene glycol reaction, can be recovered almost completely by recycling the aqueous layer into step (2) of the process, i.e., distillation of the dioxolane-water azeotrope.

The present process has many advantages over the prior art processes. One is that it involves only simple rectification operations. Another is that the amount of solvent (cyclohexane) in circulation is quite limited, and can be less than 1 percent by weight based on the dioxolane weight. Still another is that it permits the complete or essentially complete, and simultaneous, removal of all of the volatile impurities present in the dioxolane after step (2). A still further advantage is that there is a marked difference in the temperatures of the fractions treated which facilitates separations by means of conventional equipment. The ultimate advantage is that very high yields of pure or essentially pure dioxolane are recovered from the crude product of the reaction between formaldehyde and ethylene glycol, which dioxolane can be polymerized to high molecular weight polymers by cationic catalysts.

The tail fraction obtained in the rectification of the head fraction from step (2) in presence of cyclohexane consists of a mixture of 1,3-dioxolane and cyclohexane from which, on rectification of said mixture, pure anhydrous 1,3-dioxolane can be recovered. As indicated the rectification of the head fraction of step (2) in presence of cyclohexane can be carried out in such a way that the tail fraction consists of pure anhydrous 1,3-dioxolane.

The following examples are given to illustrate the invention in more detail, but are not intended to be limiting.

EXAMPLE 1

Synthesis of 1,3-dioxolane

A one-liter flask, provided with a stirrer, was loaded with 270 g of ethylene glycol, 120 g of paraformaldehyde and 2 g of $H_2SO_4$ at 98 percent concentration.

After the temperature of the mixture was brought up to 100° – 120°C a fraction with a boiling point of between 70° and 100°C was eliminated by distillation. As the distillation progressed, the flask was fed with a homogeneous suspension of paraformaldehyde in ethylene glycol, in a molar ratio of 1:1, so that the level of the reaction mixture was kept about constant. The distilled liquid showed the following composition:

| | |
|---|---|
| dioxolane | 76 % |
| water | 22.5 % |
| formaldehyde | 1.2 % |
| methanol | 0.1 % |
| formic acid | 0.1 % |
| methyl formiate | 0.1 % |

The conversion into dioxolane, with respect to the formaldehyde fed in, amounted to 97 percent.
Purification of 1,3-dioxolane
Steps 1 and 2:

To 1,000 g of the distilled liquid obtained from the synthesis reactor by the method described above, there were admixed 16 g of an aqueous solution of ammonia at a concentration of about 32 percent. Thereupon, a rectification was carried out and a head fraction was gathered which has a boiling point of 70° – 71°C. This fraction showed the following composition:

| (A) | |
|---|---|
| dioxolane | 91.2 % |
| water | 8.55 % |
| formaldehyde | 0.03 % |
| methanol | 0.1 % |
| formic acid | 0.02 % |
| methyl formiate | 0.1 % |

The total yield in dioxolane for these two operations, amounted to about 95 percent.
Step 3:

To 250 g of the distilled fraction of composition (A), obtained from the raw reaction product, the treatment with ammonia and by the subsequent rectification (steps 1 and 2), as described above, there were admixed 15 g of cyclohexane.

Thereupon, a discontinuous rectification was carried out, using a 900 mm high column (with a diameter of 30 mm), and filled with Fenske rings.

Thereby, there was obtained a head fraction that had a boiling point of 62°C, and was substantially constituted of a ternary cyclo-hexane-dioxolane-water azeotrope, which mixture then separated into two layers. The upper organic layer was gradually re-cycled into the boiler, while the aqueous layer, containing about 42 percent of dioxolane in addition to water, methanol, formic acid and methyl formate, was discharged. Distillation was then carried on until no aqueous layer separated from the distillate. The temperature of the vapors suddenly rose to 67.5°C. At this point 37 g of aqueous solution were eliminated. Thereupon, 27 g of a fraction, consisting prevailingly of the binary cyclo-hexane-dioxolane azeotrope, were distilled followed by pure dioxolane (b.p. = 76°C).

The recovery of dioxolane achieved in this step amounted to about 85 percent with respect to that contained in the starting solution. This dioxolane contained about 50 p.p.m. of water and had a titer exceeding 99.98 percent.

EXAMPLE 2

Into a continuous rectification column (25 mm. in diameter and 2,500 mm high) filled with Rashings rings of ¼ inch, was fed, at a rate of 500 g/hour, the distillate of composition (A), obtained after treatment with ammonia and rectification of the raw product of the reaction synthesis of the 1,3-dioxolane (step 1 and 2 of Example 1). At the start of the operation 200 g of cyclohexane had been introduced into the column. The dioxolanic solution, pre-heated at 60°C, was introduced into the column at a point about 2 mt from the bottom.

At the head of the column the temperature of the vapors stabilized at between 62.5°C and 63°C and the condensate was separated in a decanter, into two layers. The lower aqueous layer was drawn off (at 74 g/hr) while the organic layer was re-cycled into the column. Purified dioxolane was withdrawn from the bottom of the column, at 426 g/hr. It contained less than 40 p.p.m. of water and was free from methanol, formic acid and from esters of the acid.

The yields in pure dioxolane were greater than 93%. Carrying out the process continuously over a period of 100 hours., without any further addition of cyclohexane, the actual solvent/dioxolane ratio is about 1:250.

We claim:

1. A process for obtaining anhydrous 1,3-dioxolane having a high degree of purity, starting from raw 1,3-dioxolane in admixture with water, which process comprises:
   a. The addition of ammonia in quantities sufficient to transform the formic aldehyde and the formic acid present as impurities, into non volatile substances,
   b. The subsequent distillation for obtaining a head fraction consisting of dioxolane, water and minor quantities of volatile impurities,
   c. The subsequent rectification of the above mentioned head fraction (b), in the presence of cyclohexane, in order to eliminate the water and the other impurities in the form of a head fraction essentially consisting of a ternary cyclohexane/dioxolane/water azeotrope, which head fraction, following condensation, separates into two phases one of which, formed by cyclohexane and dioxolane, is recycled to the rectifying column, while there is obtained as a tail fraction a dioxolane/cyclohexane mixture,
   d. The rectification of the dioxolane/cyclohexane mixture for obtaining anhydrous 1,3-dioxolane with a high degree of purity.

2. The process of claim 1, characterized in that the rectification of point c) is carried out in a continuous operation and in such a way as to obtain, as a tail fraction, pure anhydrous 1,3-dioxolane.

* * * * *

UNITED STATES PATENT AND TRADEMARK OFFICE
CERTIFICATE OF CORRECTION

PATENT NO. : 3,857,759
DATED : Issued December 31, 1974
INVENTOR(S) : Leonardo Fiore, et al It is certified that error appears in the above-identified patent and that said Letters Patent are hereby corrected as shown below:

Abstract - Col. (cover page) line 6, "of" should read - - -or- - -.

Col. 1, line 34, "esepcoally" should read - - -especially- - -;

Col. 1, line 44, "extration" should read - - -extraction- - -;

line 49, "pahse" should read - - -phase- - -;

line 59, "ob" should read - - -of- - -;

line 66, "extration" should read - - -extraction- - -.

Col. 3, line 34, "distiallate" should read - - -distillate- - -.

Col. 4, line 8, "recylce" should read - - -recycle- - -.

Signed and Sealed this sixteenth Day of December 1975

[SEAL]

Attest:

RUTH C. MASON
*Attesting Officer*

C. MARSHALL DANN
*Commissioner of Patents and Trademarks*